(12) United States Patent
Rubel et al.

(10) Patent No.: US 12,336,524 B2
(45) Date of Patent: Jun. 24, 2025

(54) ELECTRICAL INSECT ELIMINATOR SIMULATED FLAME AND TRANSPARENT SAFETY CAGE

(71) Applicant: PIC Corporation, Linden, NJ (US)

(72) Inventors: Eric Rubel, Westfield, NJ (US); David L. Lowe, Port Monmouth, NJ (US); Lawrence E. Bradford, Westfield, NJ (US)

(73) Assignee: PIC Corporation, Linden, NJ (US)

( * ) Notice: Subject to any disclaimer, the term of this patent is extended or adjusted under 35 U.S.C. 154(b) by 0 days.

(21) Appl. No.: 17/825,651

(22) Filed: May 26, 2022

(65) Prior Publication Data

US 2023/0284605 A1 Sep. 14, 2023

Related U.S. Application Data

(60) Provisional application No. 63/319,617, filed on Mar. 14, 2022.

(51) Int. Cl.
*A01M 1/04* (2006.01)
*A01M 1/22* (2006.01)

(52) U.S. Cl.
CPC .............. *A01M 1/04* (2013.01); *A01M 1/226* (2013.01); *A01M 1/223* (2013.01)

(58) Field of Classification Search
CPC .......... A01M 1/04; A01M 1/223; A01M 1/22; A01M 1/106

See application file for complete search history.

(56) References Cited

U.S. PATENT DOCUMENTS

| | | | | |
|---|---|---|---|---|
| 1,743,664 A * | 1/1930 | Frost | ............... | A01M 1/04 362/253 |
| 1,936,468 A * | 11/1933 | Folmer | ............... | A01M 1/02 D26/85 |
| 3,823,506 A * | 7/1974 | Iannini | ............... | A01M 1/223 43/112 |
| 5,301,458 A * | 4/1994 | Deyoreo | ............... | A01M 1/04 43/112 |
| 8,424,239 B1 * | 4/2013 | Gallo | ............... | A01M 1/04 43/112 |
| 2003/0070346 A1 * | 4/2003 | Winner | ............... | F23D 14/28 43/112 |
| 2005/0169666 A1 * | 8/2005 | Porchia | ............... | A61L 9/14 399/111 |
| 2010/0058646 A1 * | 3/2010 | Scholz | ............... | A01M 1/04 43/112 |
| 2014/0068999 A1 * | 3/2014 | Singleton | ............... | A01M 1/223 43/132.1 |
| 2018/0343846 A1 * | 12/2018 | Horne | ............... | A01M 1/04 |
| 2019/0307113 A1 * | 10/2019 | Horne | ............... | A01M 1/04 |
| 2019/0387732 A1 * | 12/2019 | Horne | ............... | A01M 1/223 |
| 2020/0340638 A1 * | 10/2020 | Rubel | ............... | F21S 10/04 |

(Continued)

FOREIGN PATENT DOCUMENTS

WO    WO-2007045879 A1 *  4/2007  ............. A01M 1/04

*Primary Examiner* — Morgan T Jordan
*Assistant Examiner* — Carly W. Lynch
(74) *Attorney, Agent, or Firm* — Amster, Rothstein & Ebenstein LLP (57) ABSTRACT

An electric insect eliminator including a light portion and a conducting grid with a transparent cage surrounding the conducting grid to prevent contact while allowing light to pass therethrough and also amplifying the light emitted from the device.

20 Claims, 9 Drawing Sheets

(56) References Cited

U.S. PATENT DOCUMENTS

2020/0404898 A1\* 12/2020 McMillan ................ F21V 7/00
2023/0104986 A1\* 4/2023 Perlman ................ A01M 1/04
                                                                                43/107

\* cited by examiner

ELECTRICAL INSECT ELIMINATOR SIMULATED FLAME AND TRANSPARENT SAFETY CAGE

CROSS-REFERENCE TO RELATED APPLICATION

The present application claims benefit of and priority to U.S. Provisional Patent Application Ser. No. 63/319,617 filed Mar. 14, 2022 entitled ELECTRICAL INSECT ELIMINATOR SIMULATED FLAME AND TRANSPARENT SAFETY CAGE, the entire content of which is incorporated by reference herein.

BACKGROUND

Field of the Disclosure

The present invention relates to an electrical insect eliminator with a lighting element and transparent protective cage that enhances a lighting effect of the lighting element.

Related Art

Conventional electric insect eliminators are typically focused on pest control and include features that optimize pest removal, however, ignore aesthetics and other useful functionality. While conventional electric insect eliminators often emit UV light to attract insects, they do not provide sufficient visible light to aid those around them to see. Further, their design is typically not aesthetically pleasing.

In addition, conventional electric insect eliminators must include certain safety features that result in a generally closed design which generally negatively affects aesthetics of conventional devices as well as limiting the light emitted therefrom.

Accordingly, it would be beneficial to provide an electric insect eliminator that avoids these and other problems.

SUMMARY

It is an object of the present disclosure to provide an insect eliminator with a light portion that provides both a simulated flame and a constant light as well as a conductive grid to eliminate insects and a transparent safety cage that enhances light emission.

An insect eliminator in accordance with an embodiment of the present disclosure includes a housing, the housing including: a top; an outer cage extending down from the top; and a base connected to the outer cage; a transparent cage mounted in the base and positioned inside the outer cage and extending substantially from the top to the base; the transparent cage including a plurality of openings formed therein and configured to allow insects to pass therethrough; a conducting grid positioned inside of the transparent cage; a light portion provided inside the conducting grid; the light portion including: a plurality of flickering light sources configured to simulate a flame; at least one constant light source configured to provide constant light; and at least one UV light source provided in the housing and configured to emit UV light; a control circuit operably connected to the conducting grid and the light portion to control activation of the plurality of flickering light sources, the at least one constant light source, the at least one UV light source and the conducting grid.

In embodiments, the insect eliminating device includes at least one power source operably connected to one or more of the control circuit, the light portion and the conducting grid.

In embodiments, the plurality of openings formed in the transparent cage are sized to prevent a user's finger from passing through to contact the conducting grid.

In embodiments, the transparent cage is positioned between the outer cage and the conducting grid and is spaced from the outer cage to prevent a user's finger from extending through the plurality of openings to contact the conducting grid.

In embodiments, the transparent cage is positioned between the outer cage and the conducting grid and is immediately adjacent to the outer cage.

In embodiments, the transparent cage enhances transmission of light from the plurality of flickering light sources and the constant light source.

In embodiments, the plurality of flickering light sources may include: a first group of flickering light sources that are controlled by the control circuit to turn on and off together; a second group of flickering light sources that are controlled by the control circuit to dim and brighten together, wherein the second group of flickering light sources are positioned below the first group of flickering light sources.

In embodiments, the control circuit is operably connected to the plurality of flickering light sources and the at least one constant light source to activate the flickering light sources to simulate the flame while the constant light source is off.

In embodiments, the control circuit is operably connected to the flickering light sources and the at least one constant light source to activate the constant light source to provide constant light while the plurality of flickering light sources are off.

In embodiments, the control circuit controls the UV light source and the conducting grid such that the UV light source and conducting grid are activated together.

In embodiments, the at least one UV light source is mounted in the top of the housing.

In embodiments, the at least one UV light source is mounted in the base of the housing.

In embodiments, the at least one UV light source includes a first UV light source and a second UV light source and the first UV light source is mounted in the top of the housing and the second UV light source is mounted in the base of the housing.

In embodiments, the conducting grid includes a first group of conductors and a second group of conductors, wherein respective conductors of the first group of conductors are positioned adjacent respective conductors of the second group of conductors and a voltage is established between adjacent conductors.

In embodiments, the insect eliminating device includes a light sensor operable to provide ambient light information associated with ambient light around the insect eliminating device.

In embodiments, the control circuit activates at least one of the plurality of flickering light sources, the constant light source, the at least one UV light source and the conducting grid based on the ambient light information.

In embodiments, the insect eliminating device includes an input device operably connected to the control circuit and operable to provide input to the control circuit.

In embodiments, the control circuit activates at least one of the plurality of flickering light sources, the constant light source, the at least one UV light source and the conducting grid based on the input provided via the input device.

In embodiments, the insect eliminating device includes at least one removable tray mounted in the base and positioned to collect insect remains.

In embodiments, the outer cage includes four posts extending from the top to the base and supporting the top.

BRIEF DESCRIPTION OF THE DRAWINGS

The above and related objects, features and advantages of the present disclosure will be more fully understood by reference to the following, detailed description of the preferred, albeit illustrative, embodiments of the present invention when taken in conjunction with the accompanying figures, wherein.

DETAILED DESCRIPTION OF THE EXEMPLARY EMBODIMENTS

Figure 1:
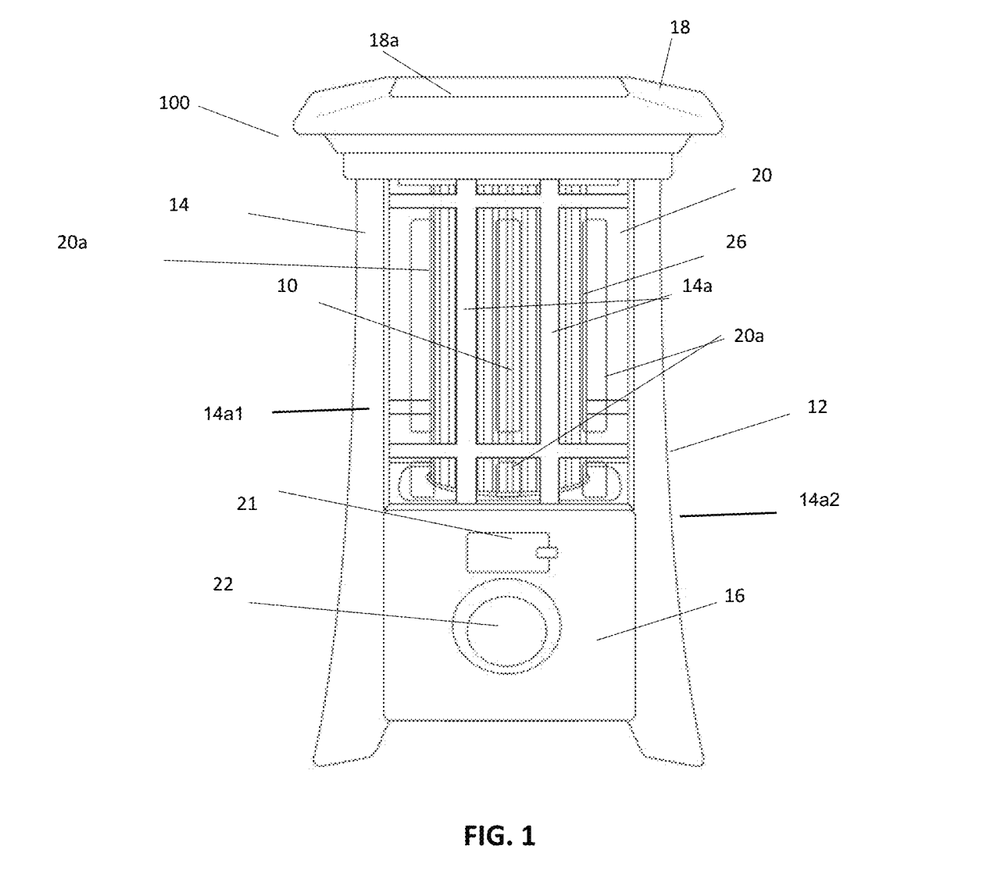
FIG. 1 illustrates a front perspective view of an electric insect eliminator in accordance with an embodiment of the present disclosure.

An electric insect eliminator 100 in accordance with an embodiment of the present disclosure is illustrated in FIG. 1. In embodiments, a light portion 10 may be mounted in a housing 12. In embodiments, the housing 12 may include an outer cage 14 surrounding the light portion 10, a base 16 from which the outer cage extends and a top 18 mounted on a top of the outer cage 14 above the lighting element.

In embodiments, the top 18 may include a solar panel portion 18a mounted on a top surface thereof. In embodiments, the outer cage 14 may surround the outer periphery of the light portion 10. In embodiments, the outer cage 14 may be made of a durable and electrically non-conductive material. In embodiments, the outer cage 14 may include a plurality of bars 14a spaced from each other by a distance of at least 1 inch to enhance visibility of the lighting element. In embodiments, the bars 14a may be vertical or horizontal. In embodiments, larger spacing between the bars 14a may be used. In embodiments, the outer cage 14, may include corner posts 14a1, 14a2, 14a3, 14a4 (see FIG. 3, for example) that extend between the top 18 and the base 16. In embodiments, the outer cage 14 may just include the corner posts 14a1, 14a2, 14a3 and 14a4 and may not include the bars 14a such that the outer cage is substantially open between the posts.

In embodiments, a transparent inner cage 20 may be mounted in the housing 12 inside the outer cage 14. In embodiments, the transparent inner cage 20 may be mounted just inside the outer cage 14. In embodiments, the transparent inner cage 20 may be positioned inside the outer cage 14 but spaced therefrom. In embodiments, the transparent cage 20 may include openings 20a that are sized to allow insects to pass through, but small enough to prevent a user's finger from entering the interior of the housing. In embodiments, the openings 20a may be vertical, as shown in FIG. 1, for example, but may be horizontal, diagonal or any other desired shape or orientation. In embodiments, the openings 20a are sized to prevent a user's finger from contacting the conducting grid 26, which is discussed in further detail below. In embodiments, specifically, the size of the openings 20a is set such that even a relatively small finger, such as that of a child, cannot extend sufficiently far into the housing 12 to contact the conducting grid 26. In embodiments, the openings 20a are aligned with the spaces between the bars 14a in the outer cage 14 to allow insects easily pass through the openings 20a. In embodiments, the position of the transparent cage 20 relative to the outer cage 14 may be selected to ensure that a user's finger will not contact the conducting grid 26 based on both the size and positioning of the openings 20a and the spacing between the transparent cage 20 and the outer cage 14.

Figure 3:
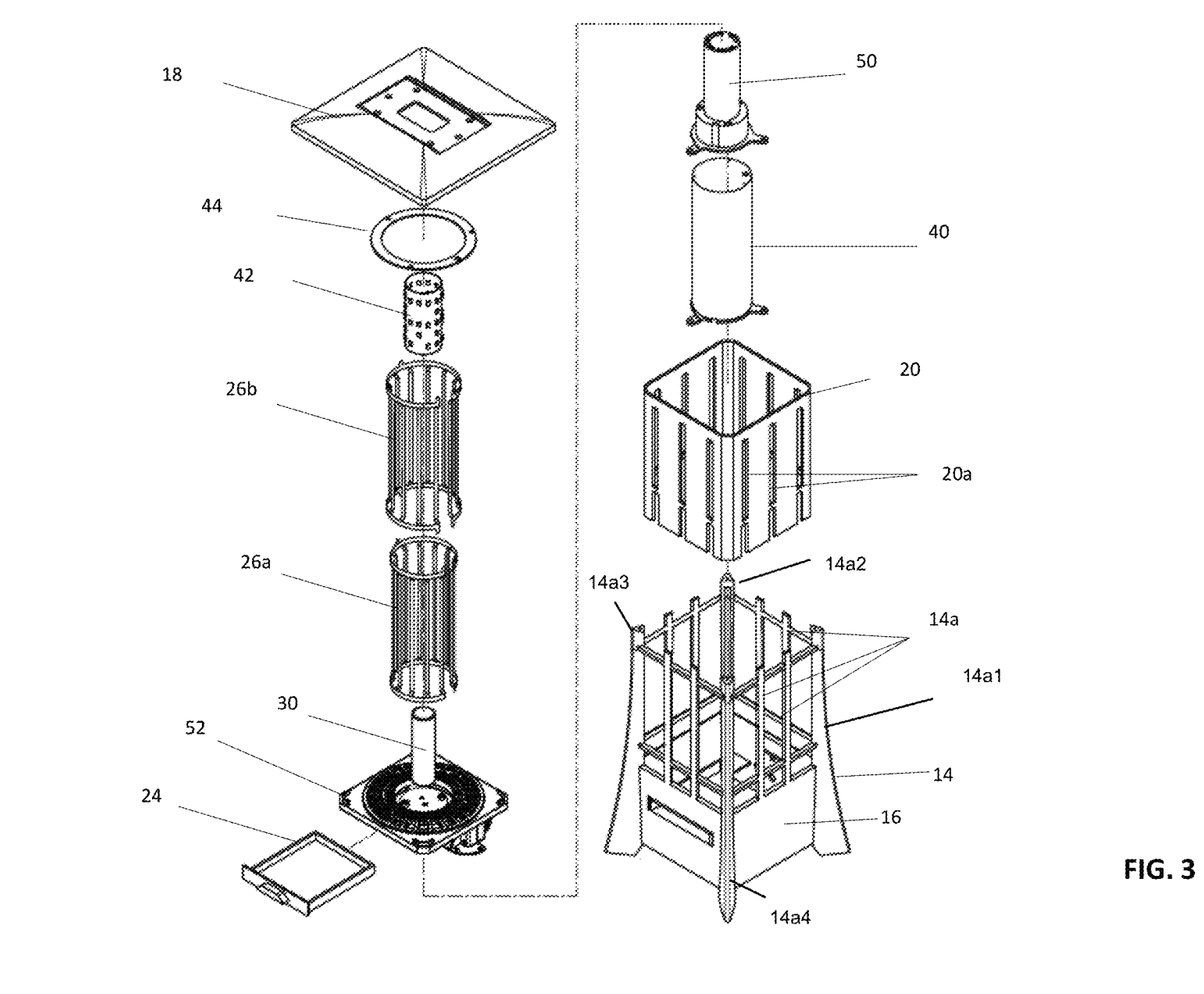
FIG. 3 illustrates an exploded view of the electric insect eliminator of FIGS. 1-2 in accordance with an embodiment of the present disclosure.
Figure 8:
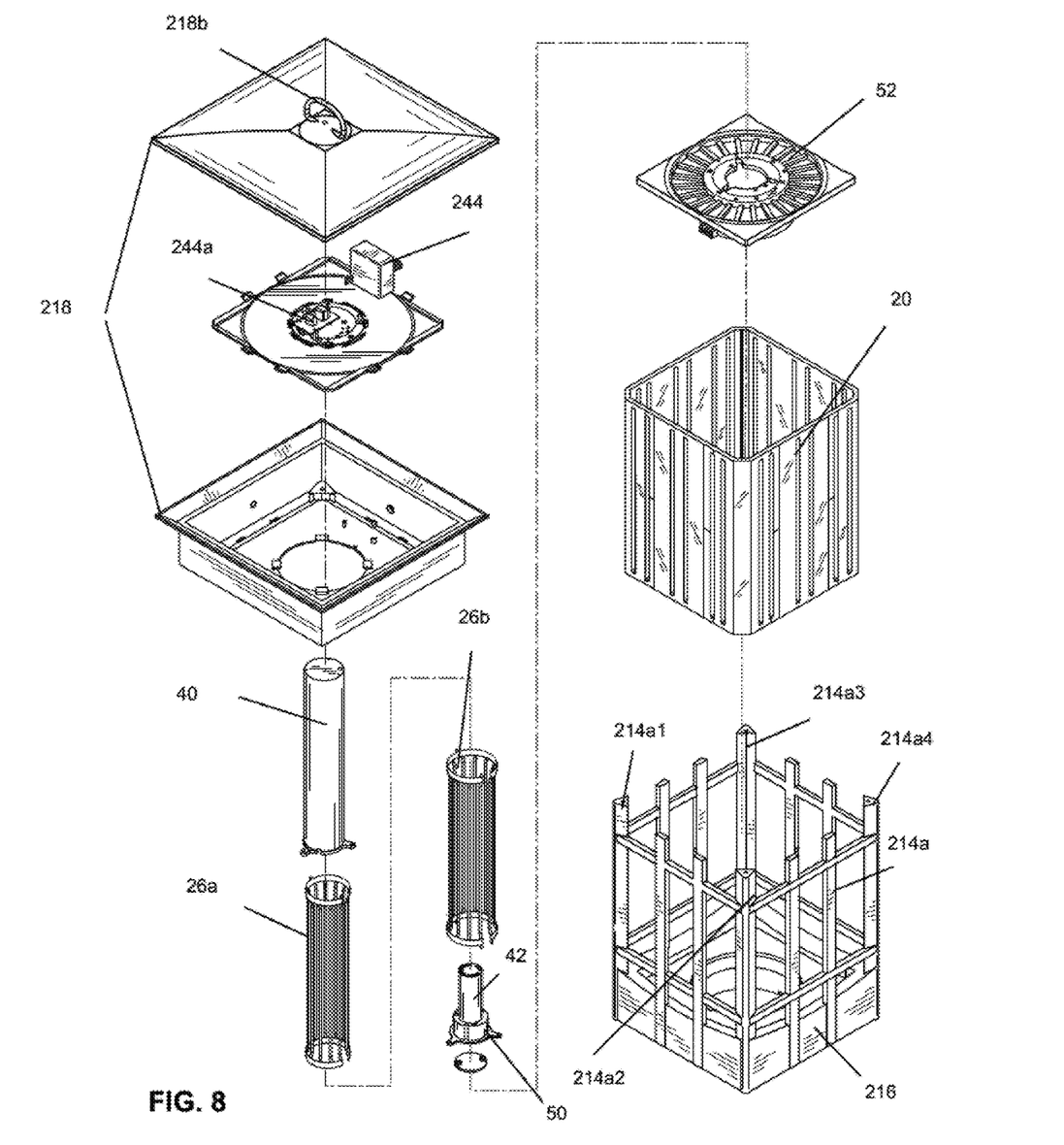
FIG. 8 illustrates an exploded view of the electric insect eliminator of FIGS. 6-7 in accordance with an embodiment of the present disclosure.
Figure 9:
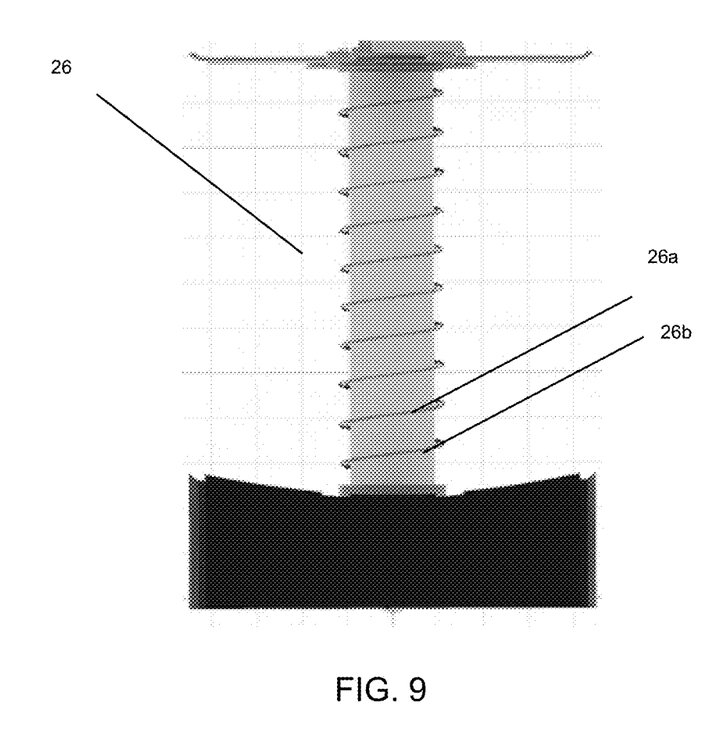
FIG. 9 illustrates an embodiment of a conductive grid suitable for use in the electric insect eliminators of FIG. 1 and FIG. 6.

In embodiments, the electrical conducting grid 26 may be provided inside the outer cage structure 14 and the transparent inner cage 20. In embodiments, the electrical conducting grid 26 may include multiple conductors that are positioned adjacent to each other in an alternating pattern. In embodiments, the electrical conducting grid 26 may be electrified such that when an insect contacts it, they are electrocuted. In embodiments, the electrical conducting grid 26 may include two groups of conductors 26a, 26b that are positioned adjacent to each other in an alternating pattern. In embodiments, the alternating conductors 26a, 26b may have a voltage established between them such that when an insect contacts a conductor and an adjacent conductor, the insect is eliminated. In embodiments, the conductors 26a, 26b may be oriented vertically as illustrated in FIGS. 3 and 8 for example. In embodiments, the conductors 26a, 26b may be oriented horizontally or in a vertical and horizontal checker board type pattern. In embodiments, the conductors 26a, 26b may be provided in spiral design as illustrated in FIG. 9, for example. In embodiments, the conducting grid 26 may be provided in any suitable configuration.

In embodiments, one or more UV light sources 32 may be provided on a bottom surface of the top 18. In embodiments, one or more UV light sources 32 may be provided in the base 16 to direct UV light upward. In embodiments, one or more UV sources 32 may be provided in the top 18 and in the base 16. In embodiments, the UV light sources 32 may be UV light emitting diodes (LEDs), however, any suitable UV light source may be used. In embodiments, the UV light sources 32 may be activated when the conducting grid 26 is energized to attract insects into the light portion 10 and toward the grid 26.

In embodiments, a removable tray 24 may be provided at a bottom of the light portion 10. In embodiments, as insects are eliminated by the grid 26, they will drop down into the tray 24. In embodiments, the tray 24 may be removed periodically to remove the insect remains. In embodiments, a power button or switch 22 may be provided on the light portion 10. In embodiments, the power button or switch 22 may be a push button, however, any button, switch or other selector element may be used. In embodiments, the power button 22 may be positioned elsewhere on the light portion 10, the base 16 or the outer cage 14.

Figure 4:
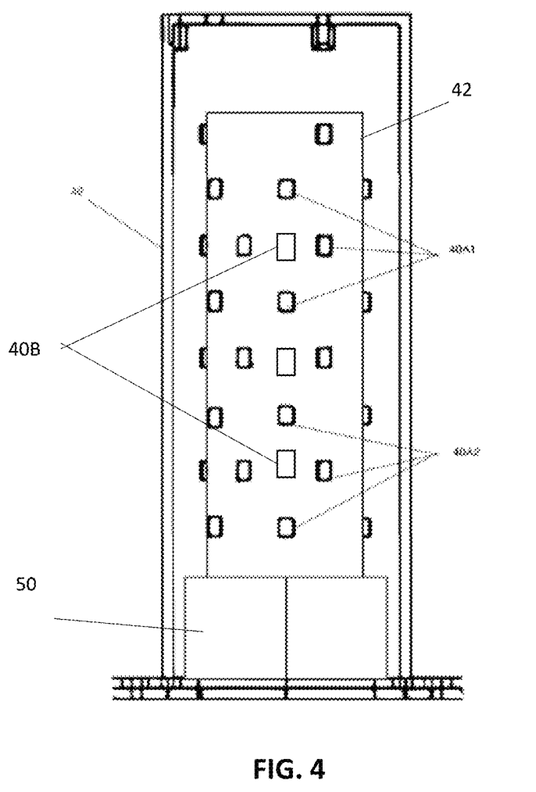
FIG. 4 illustrates a more detailed view of a light portion of the electric insect eliminator of FIGS. 1-2 in accordance with an embodiment of the present disclosure.

In embodiments, the light portion 10 may include a cylindrical shade 40 (see FIG. 4, for example) surrounding a plurality of light sources 40A1, 40A2 which may be mounted on a flexible printed circuit board 42 (see FIG. 4, for example). In embodiments, the board 42 may be mounted on a support 50. In embodiments, the light sources are LEDs 40A1, 40A2 and may be white light LEDs that emit light through the shade 40 which may be tinted or colored to provide the impression of a flame. In embodiments, one or more of the LEDs 40A1, 40A2 may be a different color in order to provide the impression of a flame. In embodiments, the LEDs 40A1 belong to a first group and the LEDs 40A2 belong to a second group. In embodiments, the first group of the LEDs 40A1 may be driven to blink on and off together. In embodiments, the second group of LEDs 40A2 may be driven to brighten and dim in intensity together. In embodiments, the second group of LEDs 40A2 may be positioned below the first group of LEDs 40A1 or vice versa. In embodiments, one or more of the light emitting diodes in the first group of LEDs 40A1 or the second group of 40A2 may be of different colors. The combination of the two groups of LEDs, when viewed through the shade 40, which may be tinted or colored as noted above, if desired, provides the impression of a flickering flame behind the grid 26 and the transparent cage 20. In embodiments, the shade 40 may be of any desired shape provided that it fits within the cage 26. In embodiments, while LEDs are preferred, other light sources may be used.

The transparent nature of the inner transparent cage 20 enhances the visual effect of the LEDs and visibility thereof from the exterior of the housing 12. In embodiments, the positioning of the transparent cage 20 may be provided to amplify the lighting provided by the light portion 10. In embodiments, the spacing between the transparent cage 20 and the light portion 10 may be set to amplify the light provided by the light portion 10 and to ensure that a user does not contact the conducting grid as discussed above. In embodiments, the thickness of the walls of the cage 20 may be set to amplify the light provided by the light portion 10. In embodiments, the transparent cage may be made of a material that enhances light transmission, such as polycarbonate, acrylic and glass, to name a few. In embodiments, the use of the transparent cage 20 to prevent contact with the conducting grid 26 allows for the spacing of the bars 14a to be increased and thus to allow more light to be emitted from the light portion 10.

In embodiments, the flame simulation may attract insects and provides for a positive aesthetic and a warmer feeling than traditional insect eliminators.

In embodiments, the light portion 10 may also be used as a constant, that is, non-flickering light. In embodiments, the substrate 42 may include additional constant light sources 40B that may be used to provide a constant light rather than the flickering effect discussed above. In embodiments, the light sources 40B may be of the same color and evenly spaced around the substrate 42. In embodiments, the light sources 40B may be activated together and remain on at the same time to provide for a constant light that does not flicker. In embodiments, the light sources 40B may be white light LEDs. In embodiments, when the light sources 40B are activated, the light sources 40A1, 40A2 are not activated such that the light portion 10 may operate in a constant light mode or a flickering mode. In embodiments, the LEDs 40A1, 40A2 may be used to provide constant light by simply being operated in an alternate state in which they do not blink on and off or dim. In embodiments, where the LEDs 40A1, 40A2 are used to provide constant light, it may not be necessary to provide the light sources 40B.

One advantage of the electric insect eliminator 100 is that it provides the aesthetics of a conventional outdoor torch while avoiding the waste products of combustion and the additional labor required to change the oil as well as the hazards of an open flame present in conventional outdoor torches. In addition, the use of the transparent cage enhances the light emitted whether from the light sources 40A1, 40A2 and the light sources 40B.

Figure 2:
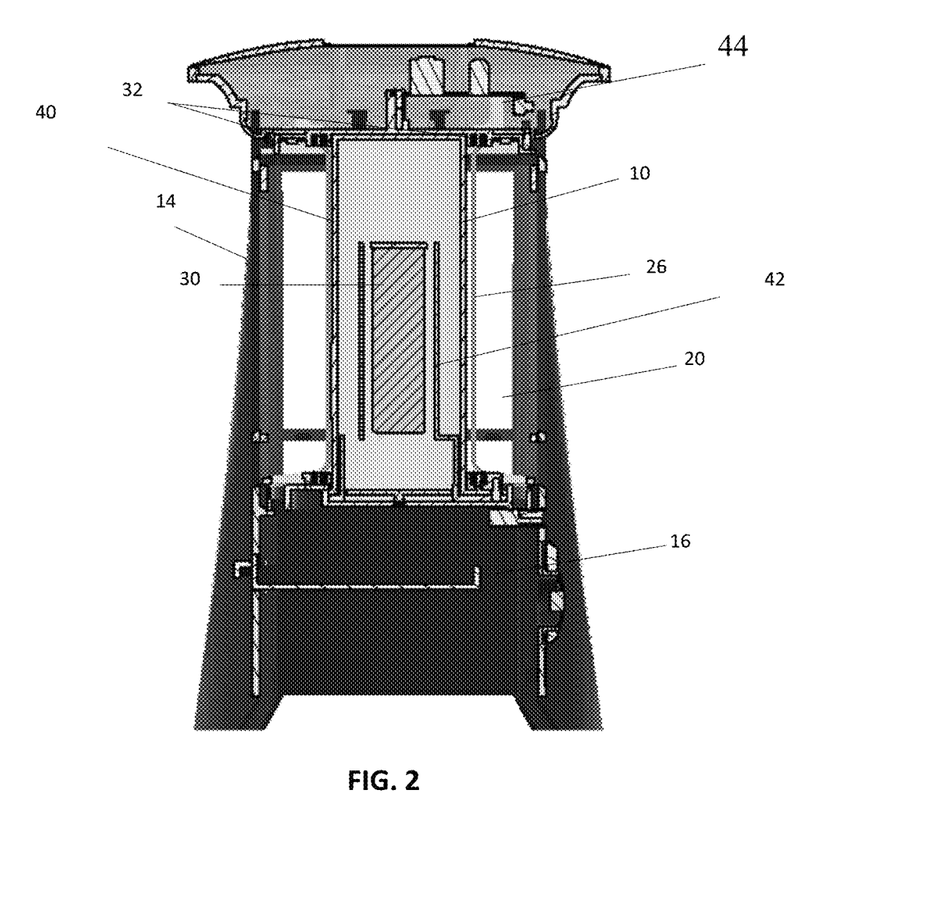
FIG. 2 illustrates a cross-sectional view of the electric insect eliminator of FIG. 1 in accordance with an embodiment of the present disclosure.

In embodiments, a circuit board 44 (see FIGS. 3 and 8) may be provided to hold or provide control circuitry, or control circuit, 44a for the lighting element 10, the UV lights 32 as well as the grid 26. In embodiments, the battery 30 (see FIG. 2) may be operatively connected to the PCB 44. In embodiments, the battery 30 may be provided on the circuit board 44. In embodiments, the control circuitry 44a may be provided elsewhere and need not be mounted on the circuit board 44. In embodiments, the battery 30 may be mounted on a base plate 52. In embodiments, the battery 30 may be a rechargeable battery and may be recharged by the solar panel 18a. In embodiments, the battery 30 may be recharged via a line voltage, if desired via a USB, wireless or other connection. In embodiments, the battery 30 may be recharged via any other suitable power source. In embodiments, a charging input or port 21 may be provided for connection to a line voltage or other power source. In embodiments, the battery 30 may be provided elsewhere in the light portion 10. While a battery 30 is illustrated, any other power source may be used. In embodiments, the power source 30 may be any suitable portable power source. In embodiments, the solar panel 18 may provide power directly, without use of the battery 30.

In embodiments, the control circuitry 44a may include an LED boost circuit (or control circuit) used to drive the UV LEDs 32. In embodiments, the boost circuit (control circuit) may be used to drive the LEDs 40A1, 40A2 and/or LEDs 40B as well. In embodiments, other driving circuitry may be provided to drive the UV LEDs 32 and/or the LEDs 40A1, 40A2 and 40B. As noted above, the two groups of LEDs 40A1, 40A2 are preferably driven in a particular sequence to simulate a flame while the LEDs 40B may be driven to provide constant light.

Figure 7:
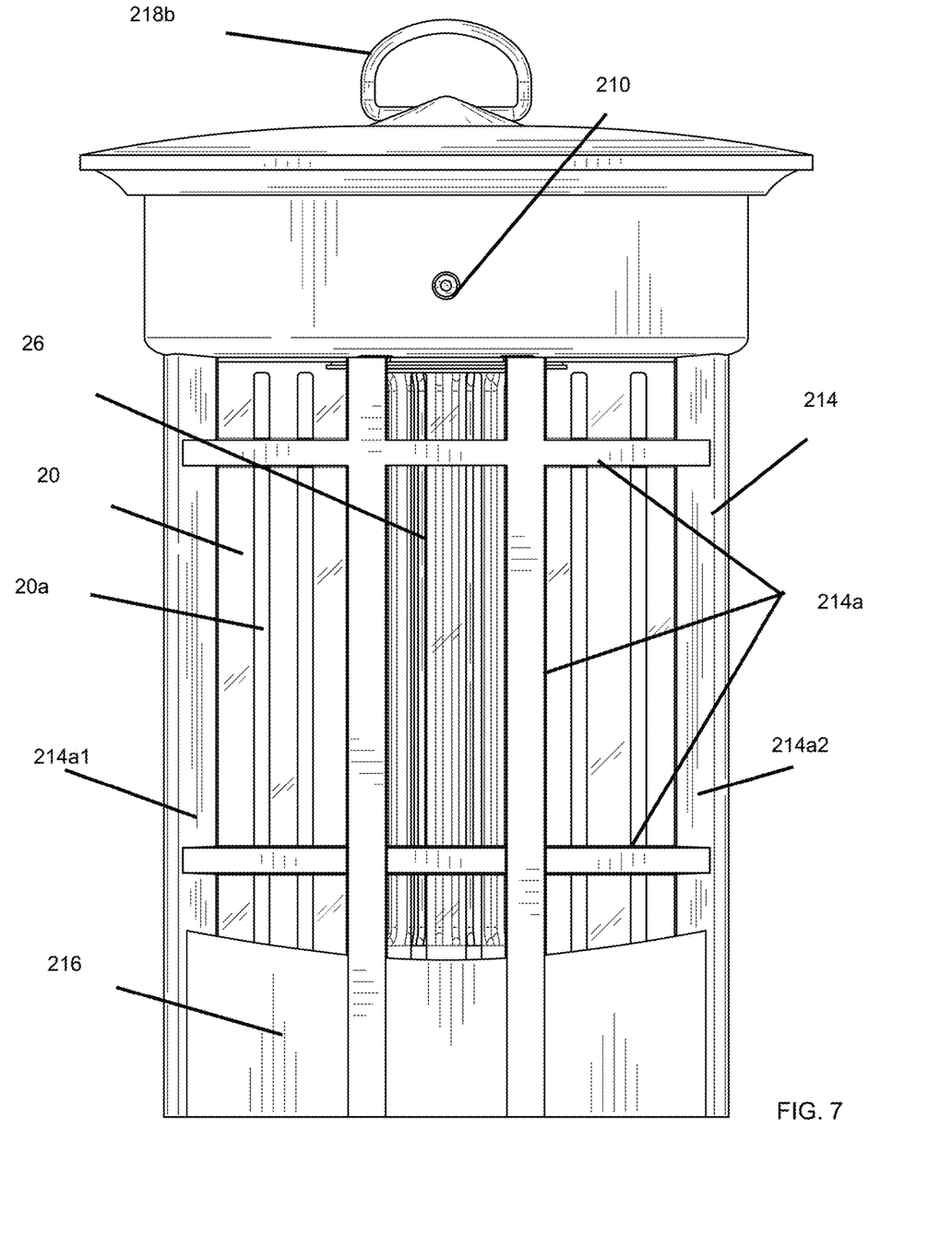
FIG. 7 illustrates a rear view of the electric insect eliminator of FIG. 6 in accordance with an embodiment of the present disclosure.

In embodiments, an input device such as a power button or switch 22 may be operable to activate the conducting grid 26 without activating the flickering effect of the LEDs 40A1, 40A2 and/or the LEDs 40B. In embodiments, the power button 22 may activate the conducting grid 26 and not the UV LEDs 32, however, typically, the grid and UV LEDs will be activated together. In embodiments, the conducting grid 26, UV LEDs 32 and the flickering LEDs 40A1, 40A2 will all be activated together by the power button 22. In embodiments, the conducting grid 26, UV LEDs 32 and the LEDs 40B may be activated together by the power button 22. In embodiments, as noted above, the additional LEDs 40B or other light sources may be used to provide for a constant light rather than flickering and may also be controlled by input from the power button 22. In embodiments, these constant light sources 40B may be activated with or without activation of the grid 26 and/or the UV LEDs 32. In embodiments, other input devices, other than the power button 22, may be used to provide input to control the conducting grid 26, the UV LEDs 32, the flickering LEDs 40A1, 40A2 and the constant light sources 40B. In embodiments, a light sensor 210 (See FIG. 7, for example) may provide information regarding ambient light levels around the electric insect eliminator 100. In embodiments, the electric insect eliminator 100 may be activated when the ambient light level drops below a threshold level and may turn off when the light level rises above the threshold. In embodiments, the electric insect eliminator 100 may be activated such that the conducting grid 26 is energized and the UV light source 32 is activated when the ambient light level drops below the threshold level. In embodiments, the conducting grid 26, the UV LEDs 32, the flickering LEDs 40A1, 40A2 or the constant light sources 40B may be activated based on the ambient light level. In embodiments, the light sensor 210 may be a photocell, however, any suitable light sensor device may be used. In embodiments, the light sensor 210 may be provided on the solar panel 18. In embodiments, the light sensor 210 may be integrated into the solar panel 18. In embodiments, as can be seen in FIG. 7 the light sensor 210 may be provided elsewhere on the electric insect eliminator 100, 200.

Figure 5:
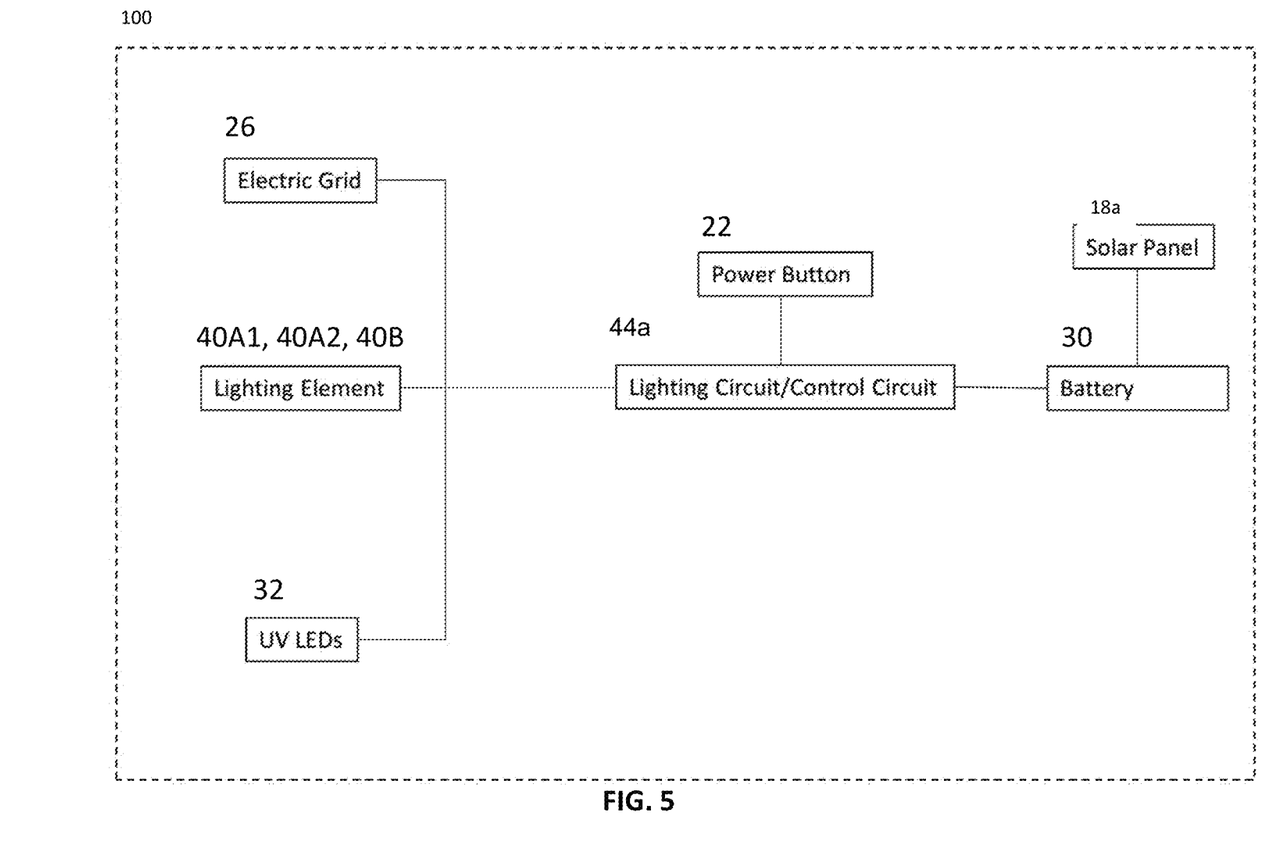
FIG. 5 illustrates an exemplary block diagram of an electric insect eliminator in accordance with an embodiment of the present disclosure.

FIG. 5 illustrates an exemplary block diagram of the light portion 10. In embodiments, the battery 30 provides power to the conducting grid 26, the UV LEDs 32 and the flickering LEDs 40A1, 40A2 and LEDs 40B. The control circuitry, or control circuit, 44a which may be provided on the PCB 44 which may be or include the boost circuit, and/or other circuitry, may drive the UV LEDs 32, the flickering LEDs 40A1, 40A2 and LEDs 40B. The control circuitry 44a may include other control circuitry to control activation of the electric grid 26. As noted above, the flickering LEDs 40A1, 40A2 may be driven in respective patterns to simulate the appearance of a flickering flame and the LEDs 40B may be activated to provide constant light when desired. The solar panel 18a may provide power to recharge the battery 30. In embodiments, the light portion 10 may include other charging circuitry or inputs to allow for USB or wireless charging, if desired. In embodiments, the control circuitry 44a may be connected to the power button 22 and may drive the grid 26, the UV LEDs 32, the flickering LEDs 40A1, 40A2 and constant light LEDs 40B based on input provided by the button 22. In embodiments, separate control circuitry may be provided and connected to the power button 22 to control the grid 26, the UV LEDs 32, the flickering LEDs 40A1, 40A2 and LEDs 40B. In embodiments, the light level information provided by the light sensor 210 may be provided to the control circuitry 44a. In embodiments, the control circuitry 44a may include a processor, microprocessor or other control element or component to provide for control of the grid 26, the UV LEDs 32 and the flickering LEDs 40A1, 40A2. In embodiments, control of the grid 26, the UV LEDs 32, the flickering LEDs 40A1, 40A2 and LEDs 40B may be based on both input from the power button 22 and the light sensor 110. In embodiments, the power button 22 may be pressed once, or placed in a first position, to enter a light monitoring mode in which power is provided to one or more of the grid 26, the UV LEDs 32, the flickering LEDs 40A1, 40A2 or constant light LEDs 40B when the light information indicates a light level below a threshold based on input form the sensor 110. In embodiments, one or more of the grid 26, the UV LEDs 32, the flickering LEDs 40A1, 40A2 and the constant light LEDs 40B may be deactivated when the light level rises above the threshold. In embodiments, pushing the button 22 again, or putting it in a second position, may directly activate one or more of the grid 26, the UV LEDs 32, the flickering LEDs 40A1, 40A2 and the constant light LEDs 40B without consideration of the light level information. In embodiments, as noted above, each of the grid 26, the UV LEDs 32, the flickering LEDs 40A1, 40A2 and constant light LEDs 40B may be activated independently, if desired, based on operation of, or the position of, the power button 22 and/or light level information provided by the light sensor. In embodiments, the grid 26 and UV LEDs 32 may be activated independent of the light level information. In embodiments, as noted above, other input elements may provide information to control the grid 26, the UV LEDs 32, the flickering LEDs 40A1, 40A2 and the constant light LEDs 40B. In embodiments, the electric insect eliminator 100 may be placed in an off mode in which all of the grid 26, the UV LEDs 32, the flickering LEDs 40A1, 40A2 and/or LEDs 40B are deactivated and stay that way regardless of light sensor information until activation of the power button 22 or another input.

Figure 6:
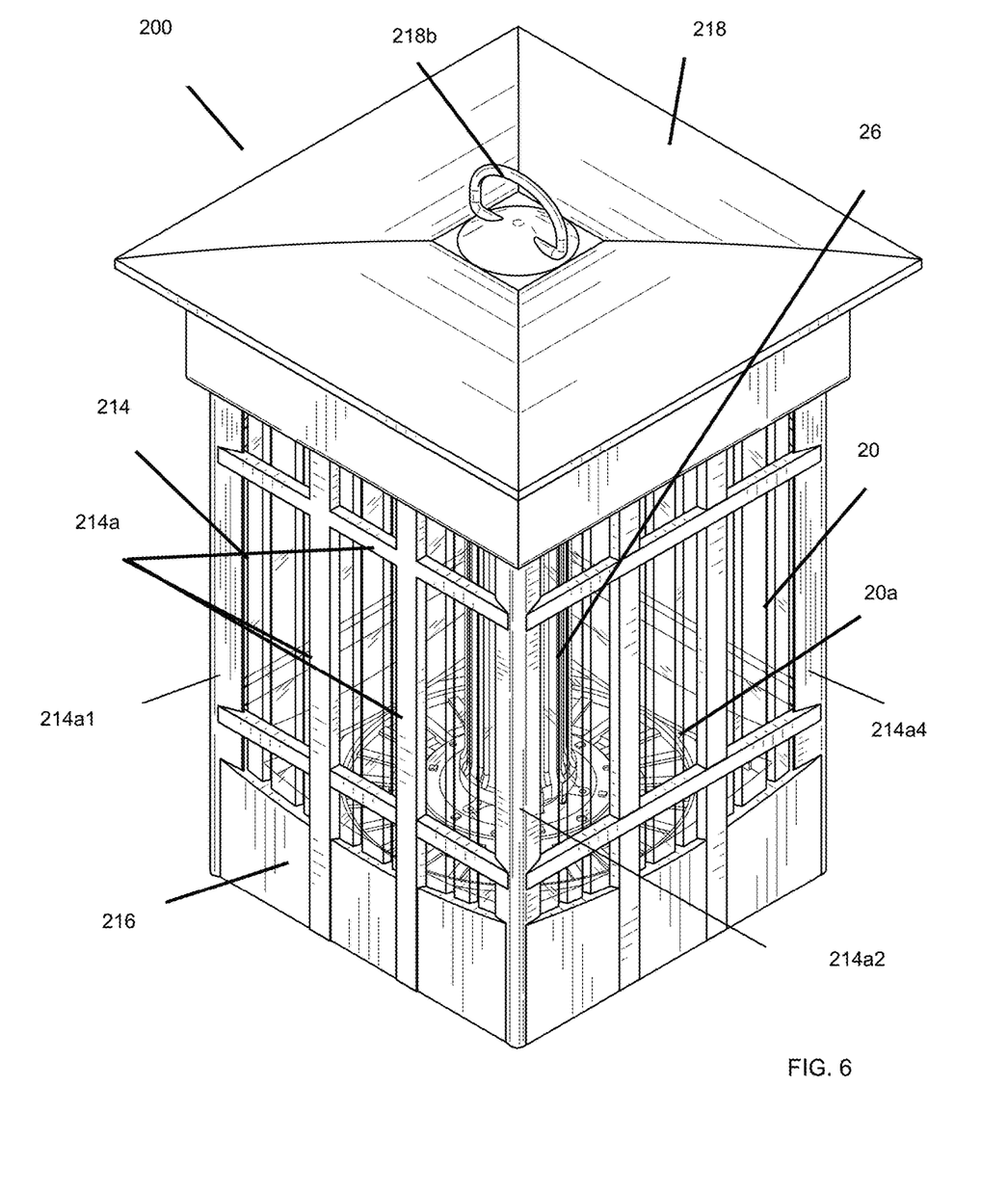
FIG. 6 illustrates a front perspective view of an electric insect eliminator in accordance with an embodiment of the present disclosure.

FIG. 6 illustrates an electric insect eliminator 200 in accordance with an embodiment of the present disclosure. The electric insect eliminator 200 is similar to the electric insect eliminator 100 discussed above and includes a ring 218b provided on a top 218 thereof from which the electric insect eliminator 200 may be suspended. In embodiments, the top 218 of the electric insect eliminator 200 is similar to the top 18 discussed above, and may include one or more circuit board 244, which may be similar to the printed circuit board 44 discussed above.

The outer cage 214 extends down from the top 218 to the base 216, which may be, or may be similar to the base 16 discussed above. In embodiments, the outer cage 214 may include posts 214a1, 214a2, 214a3 and 214a4 similar to the posts 14a1, 14a2, 14a3 and 14a4 discussed above as well as bars 214a which may be configured similar to the bars 14a discussed above. In embodiments, the posts 214a1, 214a2, 214a3 and 214a4 may be provided without the bars 214a.

In embodiments, the electric insect eliminator 200 may include light portion 10 which may be or may be similar to the light portion 10 discussed above. While not explicitly illustrated, the flexible printed circuit board 42 in FIG. 8 may include the flickering LEDs 40A1, 40A2 and LEDs 40B discussed above which may be operated in the same manner as that discussed above. In embodiments, the light portion 10 may also include UV LEDs such as the UV LEDs 32 discussed above, which may be provided in the top 218, the base 216 or both and operated in the manner described above. In embodiments, the electric insect eliminator 200 may include the conducting grid 26, which may be or may be similar to the conducting grid 26 discussed above. In embodiments, the circuit board 244 may include a control circuit or control circuitry 244a which may be used to control the light portion 10 and the conducting grid 26 in a manner similar to that discussed above with respect to the control circuitry 44a. In embodiments, the light sensor 210 may be operatively connected to the control circuitry 244a and may be used to provide light level information that may be used to control the light portion 10 and the conducting grid 26 in a manner similar to that discussed above with respect to the control circuitry 44a discussed above. In embodiments, the transparent cage 20 is mounted inside the outer cage 214 in a manner similar to that described above with respect to the outer cage 14. While not explicitly illustrated, the electric insect eliminator 200 may include an input device such as the power button 22 to provide input to the control circuitry 244a in a manner similar to that discussed above.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An insect eliminating device comprising:
   a housing, the housing including:
     a top;
     an outer cage extending down from the top including a plurality of bars with spaces provided between the plurality of bars; and
     a base connected to the outer cage;
   a transparent cage mounted in the base and positioned within the outer cage and extending substantially from the top to the base such that the transparent cage is in contact with the base and the top;
   the transparent cage including a plurality of openings formed therein and configured to allow insects to pass therethrough;
   a conducting grid positioned inside of the transparent cage;
   a light portion provided inside the conducting grid;
     the light portion including:
       a plurality of flickering light sources configured to simulate a flame;
       at least one constant light source configured to provide constant light; and
       at least one UV light source provided in the housing and configured to emit UV light;
   a control circuit operably connected to the conducting grid and the light portion to control activation of the plurality of flickering light sources, the at least one constant light source, the at least one UV light source and the conducting grid.

2. The insect eliminating device of claim 1, further comprising at least one power source operably connected to one or more of the control circuit, the light portion and the conducting grid.

3. The insect eliminating device of claim 1, wherein the plurality of openings formed in the transparent cage are sized to prevent a user's finger from passing through to contact the conducting grid.

4. The insect eliminating device of claim 1, wherein the transparent cage is positioned between the outer cage and the conducting grid and is spaced from the outer cage to prevent a user's finger from extending through the plurality of openings to contact the conducting grid.

5. The insect eliminating device of claim 1, wherein the transparent cage is positioned between the outer cage and the conducting grid and is immediately adjacent to the outer cage.

6. The insect eliminating device of claim 1, wherein the transparent cage enhances transmission of light from the plurality of flickering light sources and the constant light source.

7. The insect eliminating device of claim 1, wherein the plurality of flickering light sources include:
   a first group of flickering light sources that are controlled by the control circuit to turn on and off together;
   a second group of flickering light sources that are controlled by the control circuit to dim and brighten together,
   wherein the second group of flickering light sources are positioned below the first group of flickering light sources.

8. The insect eliminating device of claim 1, wherein the control circuit is operably connected to the plurality of flickering light sources and the at least one constant light source to activate the flickering light sources to simulate the flame while the constant light source is off.

9. The insect eliminating device of claim 1, wherein the control circuit is operably connected to the flickering light sources and the at least one constant light source to activate the constant light source to provide constant light while the plurality of flickering light sources are off.

10. The insect eliminating device of claim 1, wherein the control circuit controls the UV light source and the conducting grid such that the UV light source and conducting grid are activated together.

11. The insect eliminating device of claim 1, wherein the at least one UV light source is mounted in the top of the housing.

12. The insect eliminating device of claim 1, wherein the at least one UV light source is mounted in the base of the housing.

13. The insect eliminating device of claim 1, wherein the at least one UV light source includes a first UV light source and a second UV light source and the first UV light source is mounted in the top of the housing and the second UV light source is mounted in the base of the housing.

14. The insect eliminating device of claim 1, wherein the conducting grid includes a first group of conductors and a second group of conductors, wherein respective conductors of the first group of conductors are positioned adjacent respective conductors of the second group of conductors and a voltage is established between adjacent conductors.

15. The insect eliminating device of claim 1, further comprising a light sensor operable to provide ambient light information associated with ambient light around the insect eliminating device.

16. The insect eliminating device of claim 15, wherein the control circuit activates at least one of the plurality of flickering light sources, the constant light source, the at least one UV light source and the conducting grid based on the ambient light information.

17. The insect eliminating device of claim 1, further comprising an input device operably connected to the control circuit and operable to provide input to the control circuit.

18. The insect eliminating device of claim 17, wherein the control circuit activates at least one of the plurality of flickering light sources, the constant light source, the at least one UV light source and the conducting grid based on the input provided via the input device.

19. The insect eliminating device of claim 1, further comprising at least one removable tray mounted in the base and positioned to collect insect remains.

20. The insect eliminating device of claim 1, wherein the outer cage includes four posts extending from the top to the base and supporting the top.

* * * * *